(12) United States Patent
Potucek et al.

(10) Patent No.: US 6,304,702 B1
(45) Date of Patent: Oct. 16, 2001

(54) RAIL ADAPTER FOR FIBER OPTIC PERIMETER LIGHTING SYSTEM

(75) Inventors: Kevin L. Potucek, Simi Valley; Dennis C. Dunn, Thousand Oaks, both of CA (US)

(73) Assignee: Pac-Fab, Inc., Moorpark, CA (US)

( * ) Notice: Subject to any disclaimer, the term of this patent is extended or adjusted under 35 U.S.C. 154(b) by 0 days.

(21) Appl. No.: 09/522,863

(22) Filed: Mar. 13, 2000

Related U.S. Application Data
(60) Provisional application No. 60/162,019, filed on Oct. 27, 1999.

(51) Int. Cl.[7] .................................. G02B 6/04; F21V 7/04
(52) U.S. Cl. ......................... 385/115; 385/147; 385/901; 385/100; 362/31; 362/551; 362/554; 362/556; 362/559; 362/581
(58) Field of Search ..................................... 385/100, 115, 385/119, 147, 901; 362/31, 551, 552, 556, 559, 581, 582

(56) References Cited

U.S. PATENT DOCUMENTS

| | | | |
|---|---|---|---|
| 1,762,383 | * 6/1930 | Booraem | 385/901 |
| 5,080,460 | * 1/1992 | Erdman et al. | 385/81 |
| 5,680,496 | 10/1997 | Burkitt, III et al. | 385/100 |
| 5,695,586 | * 12/1997 | Stegmeier | 156/245 |
| 5,720,056 | * 2/1998 | Aymes | 4/488 |

* cited by examiner

*Primary Examiner*—Brian Healy
(74) *Attorney, Agent, or Firm*—Pearne & Gordon LLP

(57) ABSTRACT

A fiber optic pool lighting system includes a light adaptor cup having an open mouth adapted to be positioned over a pool wall light source. A flexible fiber optic cable bundle having an end mounted in an opening in the cup is provided so that the end is in substantial alignment with the light source. A rail adaptor attaches the cable bundle to the top rail of a swimming pool and the cable is branched from the adaptor and extends along a top rail of the pool. The branches comprise a tube having a longitudinal tail. The tail is provided with a barb which cooperates with a slot in the rail to hold the cable in place.

15 Claims, 6 Drawing Sheets

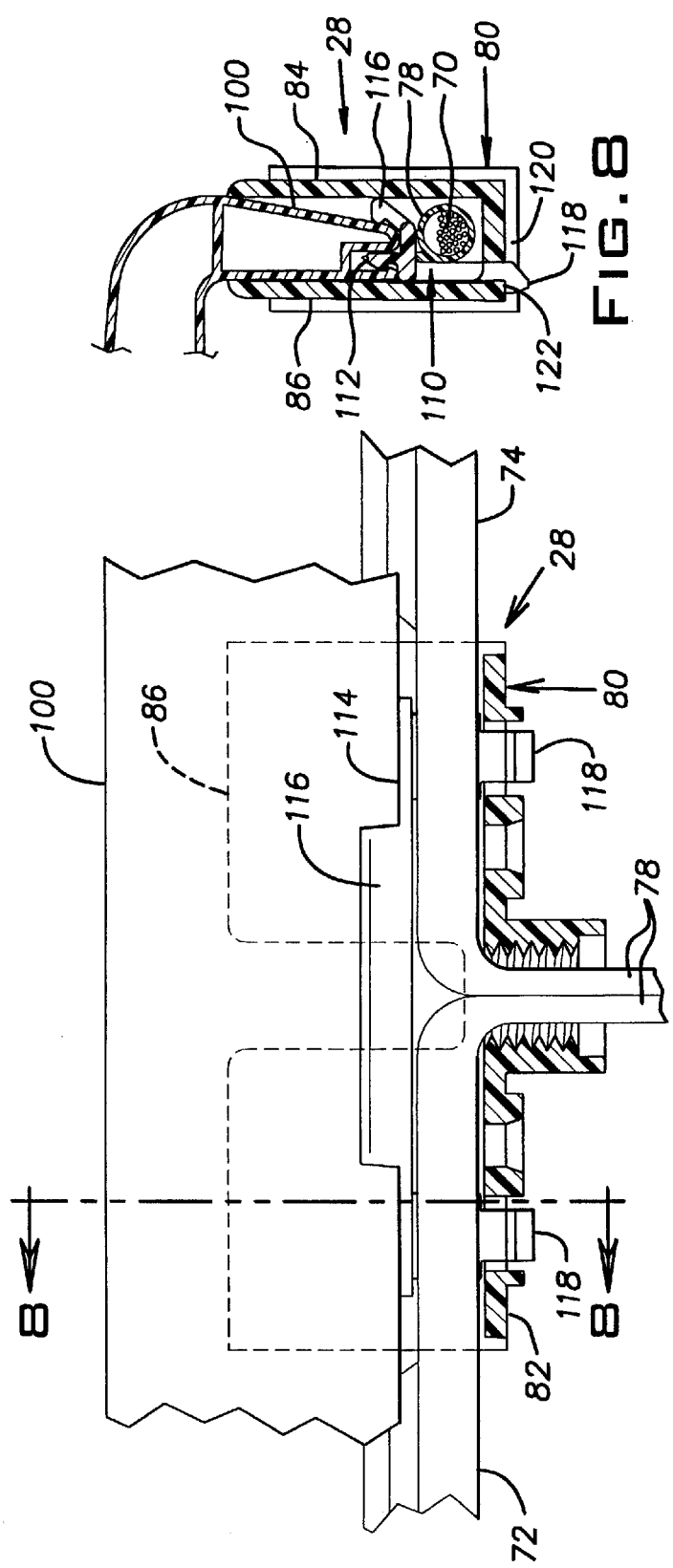
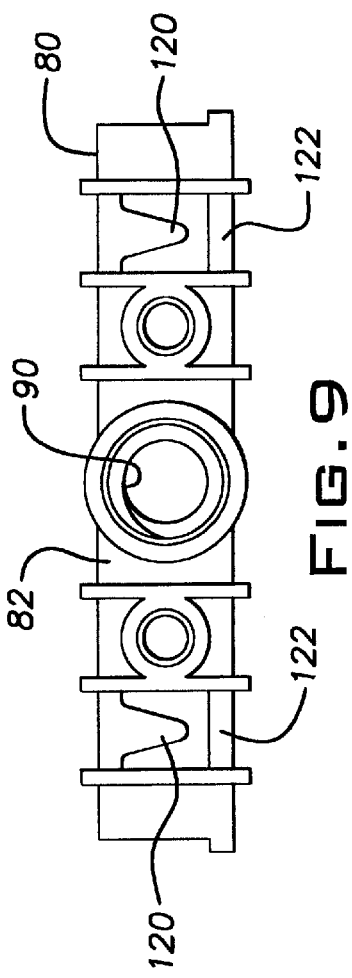
FIG. 8
FIG. 4
FIG. 9

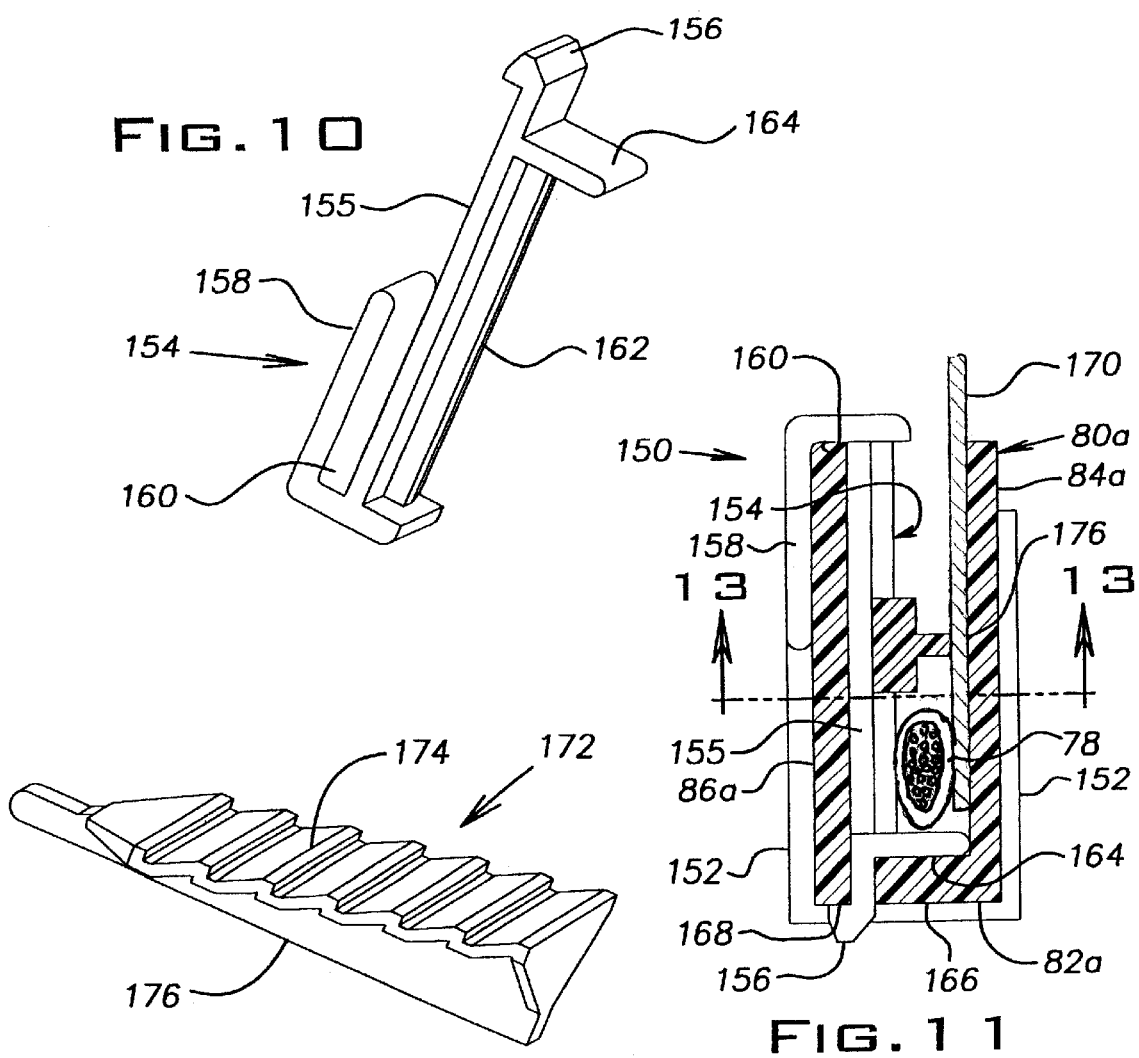
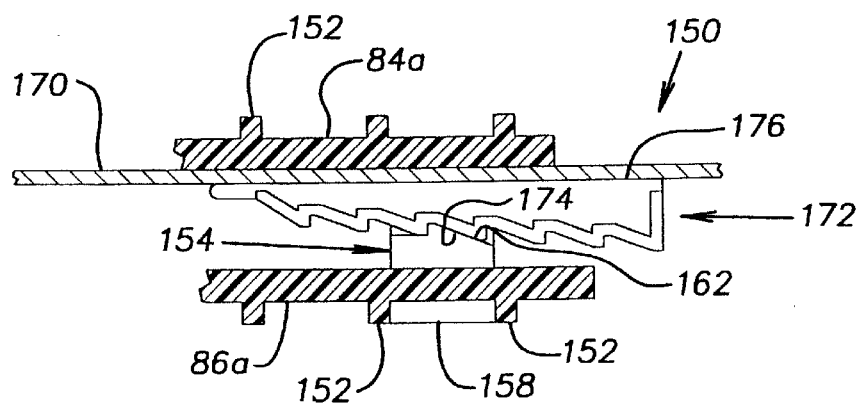

RAIL ADAPTER FOR FIBER OPTIC PERIMETER LIGHTING SYSTEM

This application claims priority based on U.S. Provisional Application Serial No. 60/162,019, filed Oct. 27, 1999 pending.

BACKGROUND OF THE INVENTION

This invention relates generally to lighting systems for swimming pools and, more particularly, to fiber optic cable assemblies that are mounted along the perimeter of above-ground swimming pools.

Submersible electric lights for the illumination of swimming pools and spas have become well known over the years. More recently, it has become popular to use fiber optic cables in swimming pool lighting systems. Fiber optic systems consist basically of a remote light source and either or a combination of two types of fiber optic cable namely end light or side light cable. End light fiber optic cable is designed to emit light from the end of a fiber opposite the light source to either provide a directly viewed point of light or to cast illumination upon an area. Side light fiber optic cable, with a clear or translucent jacket, takes advantage of light escaping from the side of the fiber or bundled fibers to deliver an effect similar to neon light for direct viewing.

One example of side light fiber optic perimeter lighting may be found in U.S. Pat. No. 5,680,496. That patent sets forth a perimeter lighting assembly which is mounted in a track around the pool periphery. The fiber optic cable assembly includes a bundle of fiber optic fibers, a tube, a track, a plurality of fasteners and securing means. The tube has a front surface and a rear surface and the bundle of fiber optic fibers is contained within the tube. The tube has flanges which fit within the track and fasteners are employed to secure the track to the side of the pool.

This arrangement is suitable for in-ground pool lighting but does not adapt well to above-ground installations because of the expense of a system effective in delivering adequate under water (end-out) and perimeter (side-out) illumination. Part of this expense is due to the cost of the fiber optic cable between its remote light source and the pool wall. Because there is a natural loss of light over distance in fiber optic cable, the fiber optic cable required between a remote light source and the pool also reduces the amount of light transmitted, reducing the light efficiency of the system. Another part of this expense is due to the large fiber cable or powerful remote light surface required to provide adequate under water illumination. Dark surfaces are more difficult to effectively illuminate than lightly colored surfaces and only very expensive fiber optic systems deliver acceptable or adequate under water illumination of darker surfaces. The vast majority of above ground pools have dark liners or liners with dense, dark, printed patterns.

Copending application Ser. No. 09/193,331 provides a perimeter lighting system which delivers adequate under water illumination and economical perimeter (side-out) fiber optic illumination by using a submersible incandescent light fixture for direct under water illumination as well as for the light source for the fiber optic cable for perimeter and other fiber optic features in the pool environment.

That application also provides adequate direct under water illumination while at the same time provides a light source for fiber optic fibers and/or fiber optic cable is for functional and/or aesthetic illumination in the pool environment.

According to that application, a fiber optic pool perimeter lighting system is provided for an above-ground pool having a pool wall and a top perimeter mounted on the pool wall. The system comprises an above-ground pool light fixture mounted in the pool wall below the water level. The light fixture is preferably of the type set forth in U.S. Pat. No. 5,207,499 and includes an outer shroud having an inlet passage for inlet pool water. A concentric water proof tube is mounted within the shroud to house the electrical connections and a light fixture. The light fixture is covered by a lens and the shroud terminates in an annular grid which serves to admit water to the pool. A light adapter cup is mounted between the light fixture lens and the grid so that the cup locates fiber ends in the optimum or near optimum light focus spot of the light fixture. The cup has a side wall and an end wall and a flexible fiber optic cable bundle has an end mounted in an opening in the end wall so that the fiber optic cable bundle end is in substantial axial alignment with the light source. A rail adapter is mounted on the top perimeter of the pool. The rail adapter is a U-shaped channel having a base portion and a pair of parallel legs extending upwardly to engage a downwardly extending flange lip of the top perimeter. The rail adapter is fixed to the flange lip by driving wedges between the lip and a leg of the U-shaped channel and silicone is injected through ports in the channel to firmly retain the rail adapter on the flange lip. A hollow flexible tube case is connected at one end to the opening in the cap and is connected at its other end to the base portion of the rail adapter. The flexible fiber optic cable bundle has a first and a second branch leg extending as a unit from the opening in the end wall of the cap, through the tube case, into the U-shaped channel, and branching individually along the flange lip in opposite directions. Any excess cable may be retained by a similar U-shaped channel.

The fiber optic cable bundle according to that application includes a flat flexible ribbon having an integral tube formed along one edge of the ribbon and a multiplicity of individual fiber optic fibers longitudinally extending in the tube. This arrangement provides a flat flexible tail which allows the cable to be fixed to the perimeter rail by an adhesive to the rearward side of the downwardly extending flange lip on the top perimeter rail. The tail may also be stapled to wooden deck structures. By allowing the cable tail and adhesive to be out of view, the adhesive does not have to have a smooth clear finish. This results in simpler installation by an untrained consumer.

The flexibility of the tail allows the tail to conform to the many diverse shapes of the underside of an above ground pool ledge. This flexibility also allows for conforming to and around irregularities in above-ground pool rail connections and corners on spa cabinets without kinking the fiber optic cable. Such kinking would cause undesirable bright spots and inhibit further light transmission in the fibers. Since the cable according to that application is designed with a loose fitting jacket or tube surrounding the multiple small polymethyl methacrylate fibers, the cable is able to conform to the above mentioned surface irregularities without creating bright spots or hindering continued light transmission. The fiber accommodates a 0.24 inch bend radius and the cable allows a 0.5 inch bend radius without kinking.

While the fiber optic cable and rail adapter assembly according to the copending application solves a number of problems relating to light transmission and cable mounting in above-ground pools, it is desirable to provide an assembly that may be installed on a wider variety of top rails and which eliminates the need for adhesives in some applications. Even though adhesives may be applied by unskilled personnel, it is a time consuming job that requires some degree of care. Further, prior to installation the pool should be partly drained until the water level is just above the bottom of the skimmer port and the front side of the fiber optic cable and the backside of the top rail inner wall should be cleaned with isopropyl alcohol and dried thoroughly. After installation, the cable adhesive should be permitted to cure for at least 24 hours prior to use.

SUMMARY OF THE INVENTION

This invention provides a fiber optic cable and rail adapter assembly which may be applied to the perimeter of an above ground pool wall without the use of adhesives by providing a mechanical interlock between the rail adapter and the top rail of the pool and by providing a mechanical interlock between the fiber optic cable and the top rail. The assembly may also be installed by adhesives to top rails which are not adapted to interlock with the fiber optic cable.

According to one aspect of this invention a fiber optic cable and rail adapter assembly includes a flat flexible ribbon having an integral tube formed along one edge of the ribbon and a multiplicity of fiber optic fibers longitudinally extending in the tube. The ribbon is extruded from a suitable clear or translucent plastic. This arrangement provides a cross-sectional shape which forms a "b". The tail of the "b" shape is inserted into a track or slot in the top rail of the pool so that the fiber carrying tube is exposed below the top rail. The tail is sufficiently flexible to follow the shape of the top rail around the pool, but is sufficiently stiff to permit insertion in the top rail slot.

The tail is provided with an end barb which cooperates with a barb formed within the slot to securely lock the tail in place. According to this aspect of the invention, the flexible tail has a maximum length of 0.35 inch, a maximum thickness of 0.065 inch, a barb on one side having a minimum thickness of 0.025 wider than the tail body, and a lead tip extending above the barb by a minimum of 0.120 inches. The limited length of the tail allows the cable to conform to the top rail, but the tail remains stiff enough in the vertical direction to allow it to be inserted into the top rail slot. The tip of the tail, of minimum length of 0.120 above the barb, prevents the tip and barb from "rolling" out of the slot when force is applied to the bulb of the cable.

This flexible tail is also designed to allow fiber optic cable installation on the top ledge of an above ground pool by means of adhesive so both the tail and adhesive are not visible, yet the fiber optic cable is fully visible. By allowing the adhesive to secure the cable tail "out of view", a smooth, clear finish is no longer required. This results in simpler installation that is suitable for an untrained consumer. The flexible durometer of the tail allows the tail to conform to the many diverse shapes of the underside of an above ground pool top ledge. This flexibility also allows for conforming to and around irregularities in above ground pool rail connections without kinking the fiber optic cable. Such kinking would cause undesirable bright spots and further light transmission in the fiber(s). Because this cable is designed with a loose fitting jacket surrounding the multiple small PMMA fibers, the cable is able to conform to the above mentioned surface irregularities without creating bright spots or hindering continued light transmission. The fiber accommodates a 0.24 inch bend radius and the cable allows a 0.5 inch bend radius without kinking.

The top rail adapter assembly is the mechanism in this system that guides the cable onto the cable mounting surface at its entry/exit point. The assembly is mechanically fixed to an integral track on the top rail and requires no adhesives for securement. The assembly also requires no hardware or tools for installation. The assembly is comprised of an internal adapter, the top rail adapter body, flexible conduit, lens, and lens grommet. The internal adapter snaps into the integral track of the top rail and performs three functions.

1. Secures top rail adapter body to the top rail via two mechanical snaps located on the bottom tabs.
2. Stabilizes the top rail adapter body and prevents forward/backward pivoting on the top rail adapter via stabilizer bar on front of internal adapter.
3. Limits the engagement of the top rail body onto the top rail via stops on two bottom tabs.

The adapter body has two exit ports, each parallel to the top rail edge, and an entry port with flexible conduit attached to guide the fiber to the light source. The lens and lens grommet secure the fiber optic cable into place and provide an optical path for incoming light into the fiber bundle.

The internal adapter can also be substituted with two wedge shaped inserts and another two separate stepped wedges. This allows the installer to employ the alternate method of utilizing adhesives to secure the top rail adapter body.

BRIEF DESCRIPTION OF THE DRAWINGS

FIG. 4 is an enlarged cross-sectional view, the plane of the section being indicated by the line 4—4 in FIG. 1;

FIG. 8 is a cross sectional view, the plane of the section being indicated by the line 8—8 in FIG. 4;

FIG. 9 is a bottom view of the top rail adapter;

FIG. 10 is a perspective view of a top rail adapter insert according to another aspect of this invention;

FIG. 11 is a cross-sectional view of a top rail adapter similar to FIG. 8 but showing the insert of FIG. 10;

FIG. 12 is a perspective view of a retaining wedge used with the insert of FIG. 10; and FIG. 13 is a fragmentary cross sectional view, the plane of the section being indicated by the line 13—13 in FIG. 11.

DETAILED DESCRIPTION OF THE INVENTION

Figure 1:
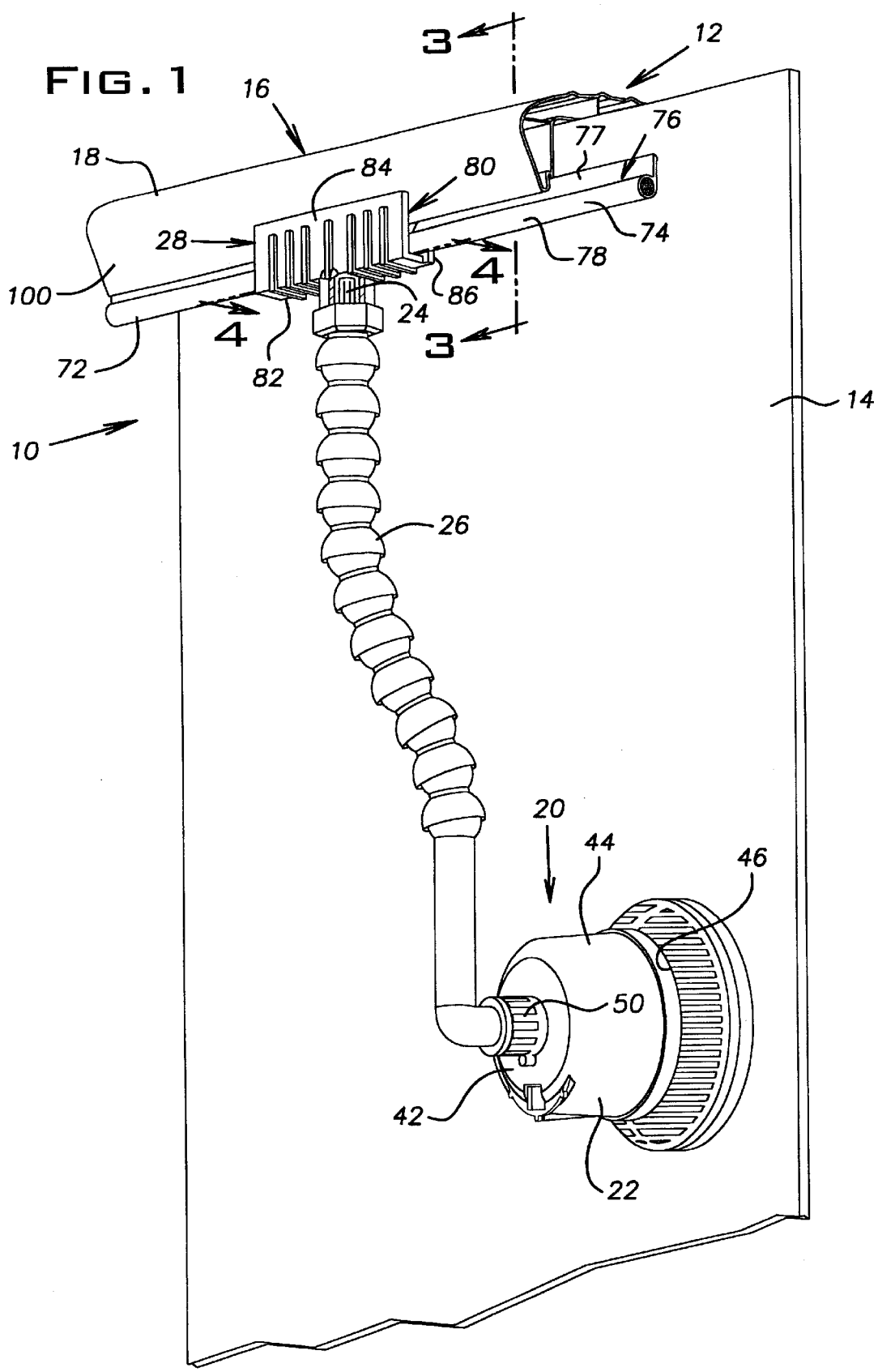
FIG. 1 is a fragmentary perspective view of an above-ground pool having a perimeter lighting system according to this invention.
Figure 2:
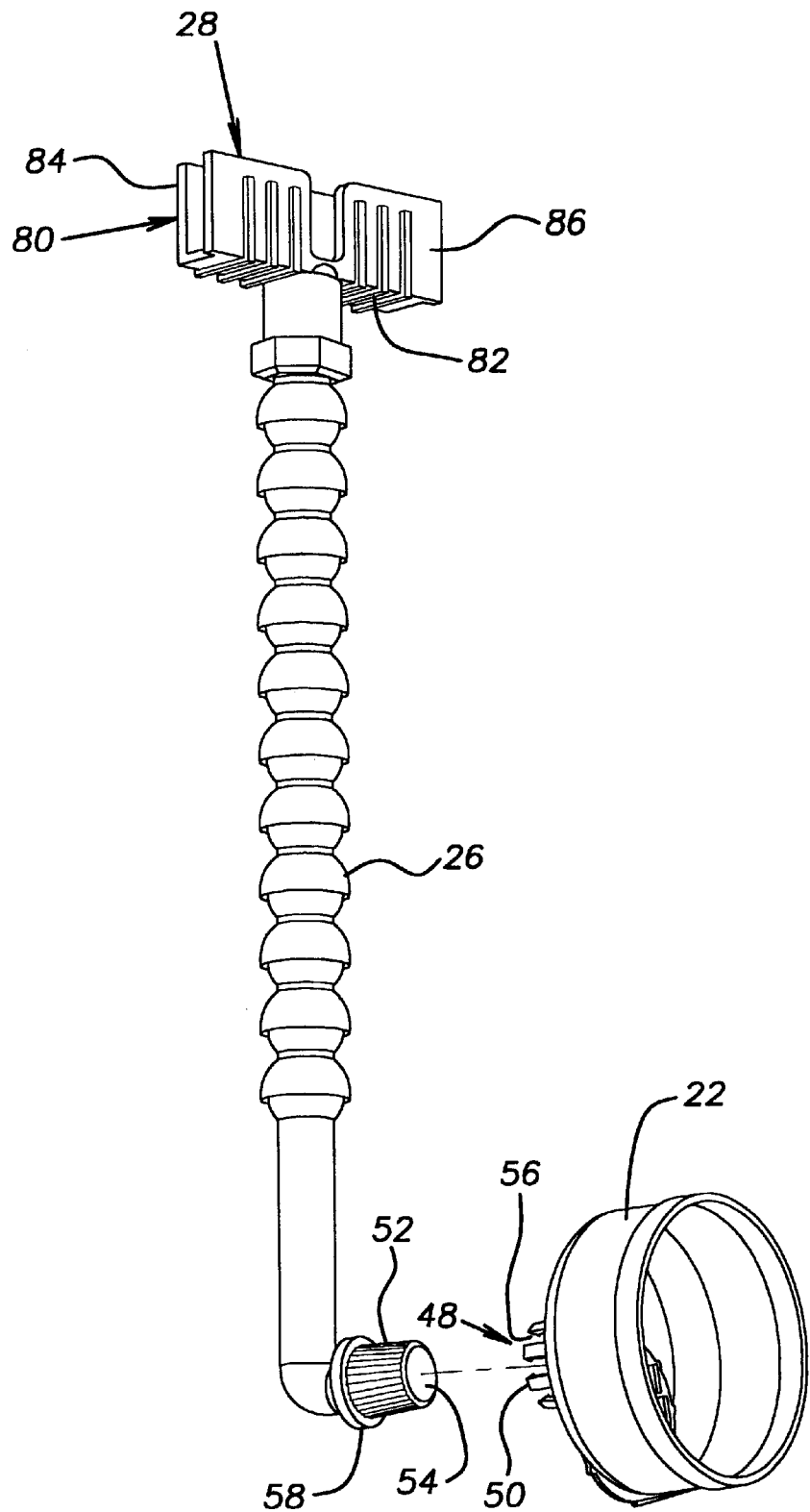
FIG. 2 is a fragmentary perspective view of a top rail and perimeter lighting assembly with the assembly viewed from the pool wall.

Referring now to the drawings and, particularly, to FIG. 1 there is illustrated a perimeter lighting system 10 according to this invention. The lighting system 10 is adapted for use with and above-ground swimming pool 12. The swimming pool 12 has a side wall 14 and a top wall or perimeter 16 which is provided with a downwardly extending top flange lip or rail 18.

The system 10 includes a pool light fixture 20, a light adapter cap 22, a flexible fiber optic cable bundle 24 received within a hollow flexible tube case 26, and a rail adapter 28.

The pool light fixture 20 is preferably of the type set forth in U.S. Pat. No. 5,207,499 and is adapted to be mounted through an opening (not shown) in the pool wall 14. The opening is provided by the pool manufacturer as a location for a water inlet source to the pool. The lighting fixture is more particularly described in U.S. Pat. No. 5,207,499, the subject matter of which is incorporated herein by reference.

The light adapter cap 22 has an end wall 42 and a side wall 44. The rim of the side wall 44 fits into a groove 46 provided in the light fixture 20. The end wall 42 defines an axial opening 48 which is further defined by a plurality of fingers 50.

The flexible fiber optic cable bundle 24 has an end terminated by an adapter cap 52 provided with a lens 54. The adapter cap 52 is received within the opening 48 and is releasably retained therein by barbs 56 which snap over a rim 58 of the adapter 52.

Figure 3:
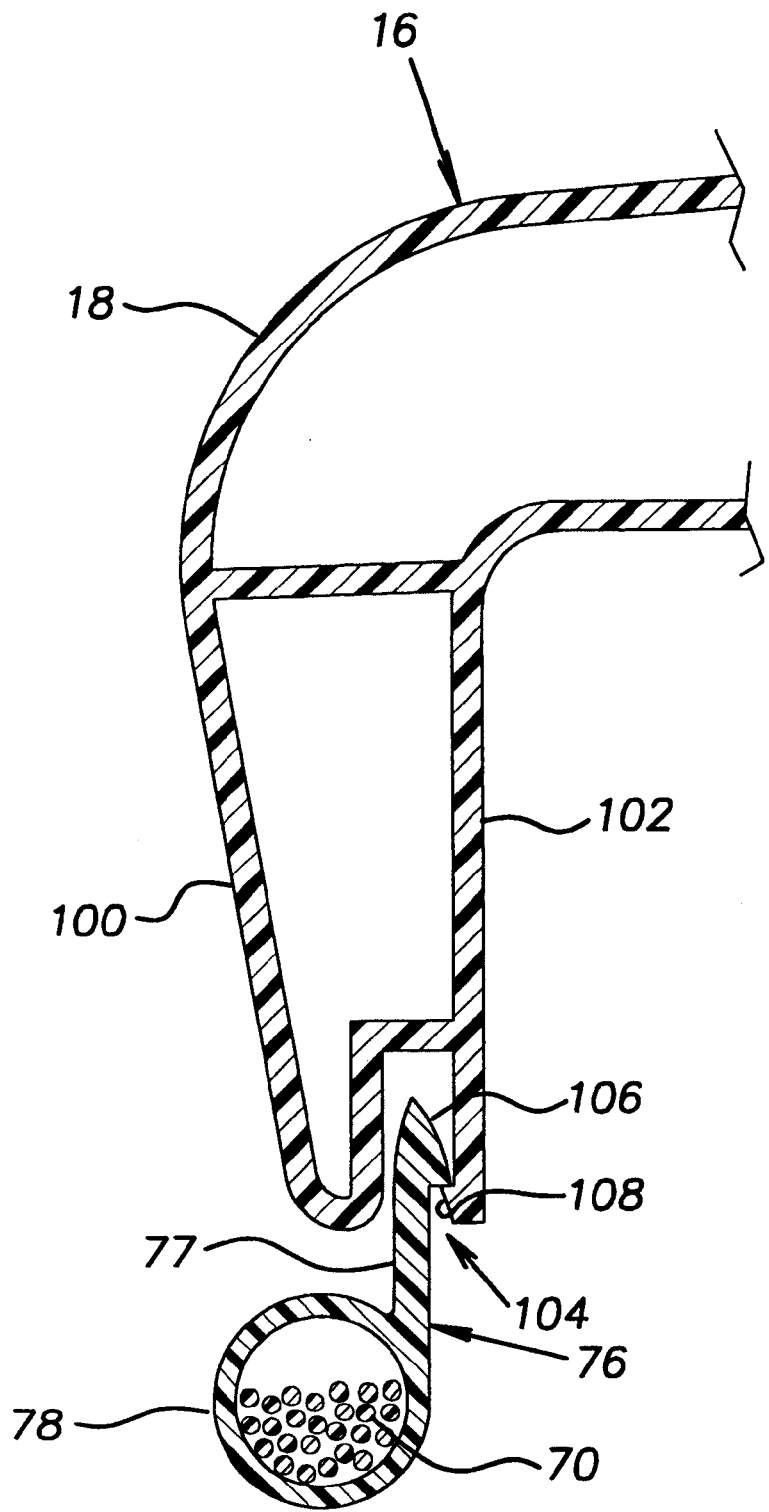
FIG. 3 is an enlarged cross-sectional view, the plane of the section being indicated by the line 3—3 in FIG. 1.
Figure 5:
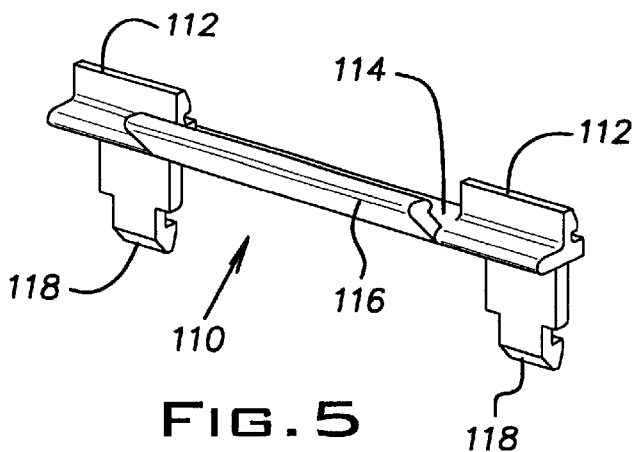
FIG. 5 is a perspective view of a top rail insert employed in the assembly of FIG. 1.
Figures 6, 7:
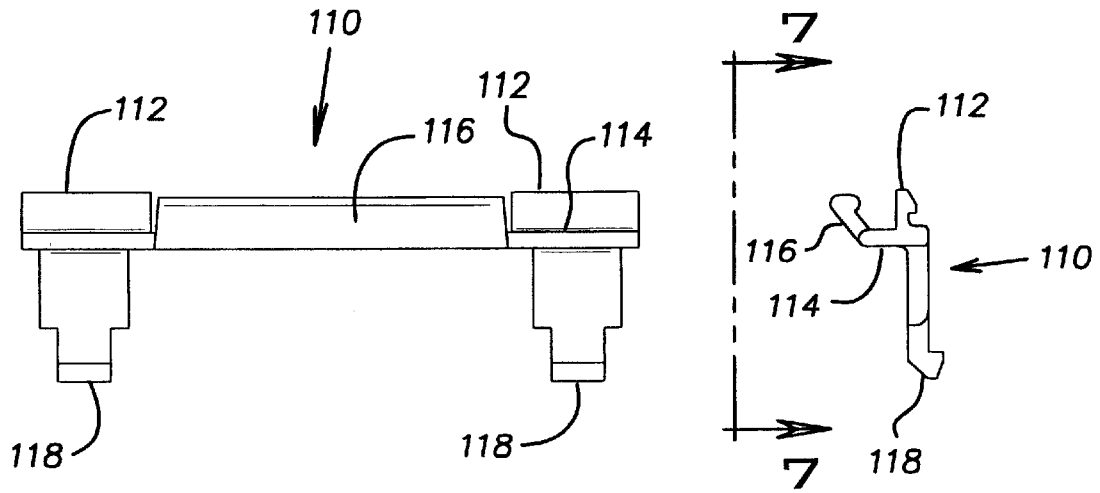
FIG. 6 is an end view of the insert.
FIG. 7 is an elevational view of the insert, the direction of the view being indicated by the line 7—7 in FIG. 6.

The bundle 24 includes the fibers of first and second branches 72 and 74 (FIG. 1). As may be seen in FIGS. 1 and 3 a cable branch is comprised of a flat flexible ribbon 76 which comprises a tail 77 and an integral tube 78 formed along one edge of the ribbon 76. Individual optic fibers 70 are contained in the tube 78. The tail and tube are preferably formed from light transmitting polyvinylchloride (PVC) and may be either translucent or transparent. The individual fibers 70 are preferably polymethyl methacrylate having a diameter of less than 0.1 inch and preferably 0.03 inch. The fiber accommodates a 0.24 inch bend radius and the cable allows a 0.5 inch bend radius without kinking. The tail and tube provide a cross-sectional shape which forms a "b".

The fiber bundle extends from the adapter lens 52 within the hollow flexible tube case 26 to the top rail adapter 28. That portion of the bundle 24 which extends through the tube case 26 has its flat ribbon or tail portion cut away so that only tubular portions 78 are within the tube case 26. As may be seen in FIGS. 1, 2, 4, 8, and 9 the top rail adapter 28 comprises a U-shaped channel 80 having a base portion 82 and a pair of parallel legs 84 and 86 extending upwardly from the base 82. The flexible tube case 26 is received in a cable port opening 90 in the base 82 and the cable bundle is branched into the branch legs 72 and 74 along the bottom of the channel 80.

The top rail 18 has a curved front face 100 and a relatively flat rear face 102 which define a slot or track 104. The track 104 receives the tail 77 of the ribbon 76. As may be noted in FIG. 3, the tail 77 is provided with a barb 106 which cooperates and locks with a barb 108 projecting into the slot 104 from the rear wall 102.

The length of the tail 77 is preferably 0.35 inch with a thickness of 0.065 inch. This allows the tube 78 to be flexible for conforming to irregularities of the top rail but the tail remains stiff enough in the vertical direction to allow it to be forced into the slot 104. The tip of the tail, of minimum length of 0.120 inches above the barb and a minimum barb thickness of 0.025 wider than the tail body, prevents the tip and barb from "rolling" out of the track when force is applied to the tube 78.

The top rail adapter 28 is the mechanism that guides the cable or ribbon 76 onto the cable mounting surface at its entry/exit point. The assembly is mechanically fixed to the slot 104 on the top rail 18 and requires no adhesives for securement.

The top rail adapter 28 is fixed to the flange by a top rail insert 110. The insert has a pair of top barbs 112, a body portion 114, an angular wedge portion 116, and a pair of depending adapter locking tabs 118. The insert 110 is mounted in the rail by snapping the top barbs into the slot 104 to engage the barb 108. The U-shaped channel 80 is moved upwardly toward the insert 110 and over the portions of the cable having the tails removed, as may best be seen in FIG. 8. The locking tabs 118 are forced past a pair of tongues 120 (FIG. 9) in the base portion 82 of the channel 80 to lock with a shoulder 122. It may be noted that the wedge portion is firmly between the leg 84 and the front face 100 to prevent rocking of the adapter 28.

Referring now to FIGS. 10, 11, and 12, there is illustrated a rail adapter assembly which may be installed on rails which have configurations similar to those illustrated in copending application Ser. No. 09/193,331. The rail adapter assembly 150 includes a rail adapter 28a which is identical to the rail adapter 28. The rail adapter 28a includes a U-shaped channel 80a having a base portion 82a and a pair of parallel legs 84a and 86a extending upwardly from the base 82a. The rail adapter further includes a plurality of spaced reinforcement ribs 152 on the legs 84a and 86a.

A pair of substantially identical rail adapter inserts 154 are mechanically locked to the rail adapter 28a adjacent each end of the adapter 28a. Only the left insert 154 (as viewed from the pool side or leg 84a of the adapter 28a) is illustrated herein. A right insert 154 (not shown) is provided in an identical position at the other end of the adapter 28a.

Each insert 154 includes a body portion 155 having a locking tab 156 at one end and a depending portion 158 forming a pocket 160 at its other end. The body portion 155 is provided with a ramp 162. The body portion on the other insert is provided with an oppositely facing ramp. Each insert further includes a base engaging leg 164.

Each insert 154 is mounted in the adapter 28a by positioning the depending portion 158 between adjacent ribs 152 and pushing the insert downwardly so that the pocket receives the leg 86a and the locking tab 156 is forced past a tongue 166 formed in the base 82a to lock with a shoulder 168.

With the tube 78 in place, the adapter 28a is positioned against a rail 170 as shown in FIG. 11. A pair of wedges 172 are then inserted into the ends of the adapter 28a. Each wedge 172 has a sloped face defined by a plurality of ratchet teeth 174 which are adapted to lockingly engage the ramp 162 of each insert 154, as may be seen in FIG. 13. The wedges 172 are inserted in this manner so that a bearing face 176 of each wedge 172 securely engages the rail 170 and clamps it against the leg 84a of the adapter 28a.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed:

1. A fiber optic pool perimeter lighting system for a pool having a pool wall and a top perimeter comprising a rail mounted on the pool wall, a slot defined by said rail, a light source, a flexible fiber optic cable bundle having an end in substantial axial alignment with said light source, a rail adaptor mounted on said rail, said rail adaptor comprising a U-shaped channel having a base portion and a pair of substantially parallel legs extending upwardly from said base and engaging a front and rear face of said rail, said base portion having at least one locking tongue, a rail insert within said rail adaptor, said rail insert having a first barb received in said slot and interlocking with a second barb defined by said slot, said rail insert having a locking tab interlocking with said locking tongue, said fiber optic cable bundle extending through an aperture in said base portion and having branches extending in opposite directions along said base portion and along the rail beyond said adaptor, each of said branches comprising a plurality of fibers encased in a tube, the branches which extend beyond said adaptor and along said rail having substantially flat tails formed integrally with said tube, said tails being received in said slot.

2. A fiber optic pool perimeter lighting system according to claim 1 wherein said tails are provided with a third barb which cooperates with said second barb defined by said slot.

3. A fiber optic pool perimeter lighting system according to claim 1 wherein said rail insert has a wedge portion positioned between a face of said rail and one of said parallel legs of said U-shaped channel.

4. A fiber optic pool perimeter lighting system according to claim 3 wherein said wedge portion is positioned above said branches.

5. A fiber optic pool perimeter lighting system according to claim 1 wherein said light source is a pool light fixture mounted in the pool wall.

6. A fiber optic pool perimeter lighting system for a pool having a pool wall and a top perimeter rail comprising a light source, a flexible fiber optic cable bundle having an end in substantial axial alignment with said light source, a rail adaptor mounted on said rail, said rail adaptor comprising a U-shaped channel having a base portion and a pair of substantially parallel legs extending upwardly from said base portion and straddling front and rear faces of said top perimeter rail; said base portion having at least one locking tongue, said fiber optic bundle extending from said light source and through an aperture is said base portion and having branches in opposite directions along with said base portion and along the rail beyond said adaptor, each of said branches comprising a plurality of fibers encased in a tube, the branches which extend beyond said adaptor and along said rail having substantially flat tails formed integrally with said tubes, said tails being secured to the rear faces of said rail so that said tube is exposed along a bottom edge of said rail, at least one rail adaptor assembly, said assembly comprising a rail adaptor insert having a body portion provided with a locking tab at one end thereof interlocking with said locking tongue, said body portion having a longitudinal surface forming a ramp, and a tapered wedge between said ramp and the rear face of said rail to secure said rail adaptor to said rail.

7. A fiber optic pool perimeter lighting system according to claim 6 wherein said wedge has a plurality of ratchet teeth adapted to engage an end of said ramp to secure said wedge between said ramp and said rear face of said rail.

8. A fiber optic pool perimeter lighting system according to claim 6 wherein said wedge extends over said branches.

9. A fiber optic cable comprising a tube having an integral flat tail extending longitudinally along said tube, and a multiplicity of individual fiber optic fibers longitudinally extending in said tube, a distal edge of said tail forming a barb.

10. A fiber optic cable according to claim 9 wherein said tube is light-transmitting PVC.

11. A fiber optic cable according to claim 10 wherein said light-transmitting PVC is translucent.

12. A fiber optic cable according to claim 10 wherein said light-transmitting PVC is transparent.

13. A fiber optic cable according to claim 9 wherein said fibers are polymethyl methacrylate having a diameter of less than 0.1 inch.

14. A fiber optic cable according to claim 13 wherein said fibers have a diameter of 0.03 inch.

15. A fiber optic cable according to claim 9 wherein said cable has a bend radius of 0.5 inch.

* * * * *